(12) United States Patent
Felisari et al.

(10) Patent No.: US 10,183,264 B2
(45) Date of Patent: Jan. 22, 2019

(54) PROCESS FOR THE INSERTION AND CONVEYING OF LABILE ADDITIVES IN STREAMS OF MOLTEN MATERIAL

(71) Applicant: Versalis S.P.A., San Donato Milanese (IT)

(72) Inventors: Riccardo Felisari, Mantova (IT); Alessandro Casalini, Mantua (IT); Olga Valentino, Mantova (IT)

(73) Assignee: Versalis S.p.A., San Donato Milanese (IT)

( * ) Notice: Subject to any disclaimer, the term of this patent is extended or adjusted under 35 U.S.C. 154(b) by 246 days.

(21) Appl. No.: 14/390,805

(22) PCT Filed: Apr. 3, 2013

(86) PCT No.: PCT/IB2013/052653
§ 371 (c)(1),
(2) Date: Oct. 6, 2014

(87) PCT Pub. No.: WO2013/150456
PCT Pub. Date: Oct. 10, 2013

(65) Prior Publication Data
US 2015/0063054 A1   Mar. 5, 2015

(30) Foreign Application Priority Data

Apr. 6, 2012 (IT) .............................. MI2012A0571

(51) Int. Cl.
*B29C 47/10* (2006.01)
*B01F 15/02* (2006.01)
(Continued)

(52) U.S. Cl.
CPC ...... *B01F 15/0251* (2013.01); *B01F 15/0254* (2013.01); *B29C 47/109* (2013.01);
(Continued)

(58) Field of Classification Search
CPC .................................................. B29C 47/1063
(Continued)

(56) References Cited

U.S. PATENT DOCUMENTS 2,758,553 A * 8/1956 Moser .................... A23G 9/282
137/896
5,190,706 A * 3/1993 Knaus .................... B29C 44/04
264/146
(Continued)

FOREIGN PATENT DOCUMENTS

EP          0668139 A1    8/1995
WO    WO2005056654 A1    6/2005
(Continued)

OTHER PUBLICATIONS

International Preliminary Report on Patentability dated Jul. 30, 2014 for PCT/IB2013/052653.
(Continued)

*Primary Examiner* — David L Sorkin
(74) *Attorney, Agent, or Firm* — Abel Law Group, LLP

(57) ABSTRACT

The present invention relates to a process for the insertion and conveying of a labile additive, or a mixture thereof, in a transporting pipe, in which a main stream of molten material flows, said process characterized in that it incorporates said additive, or said mixture, in a portion of the pipe delimited by the main stream, according to one of the following alternative modes: a) in a longitudinal direction with respect to the flow direction of the main stream of molten material, or b) in a transversal direction with respect to the flow direction of the main stream of. molten material, or c) according to a composition of the longitudinal (a) and transversal (b) mode, thus forming a resulting stream which keeps the labile additives segregated from the main stream of molten material.

25 Claims, 8 Drawing Sheets

(51) Int. Cl.
    C08J 3/20       (2006.01)
    B29C 47/62      (2006.01)
    B29C 47/36      (2006.01)
(52) U.S. Cl.
    CPC ........ *B29C 47/1063* (2013.01); *B29C 47/366*
        (2013.01); *B29C 47/369* (2013.01); *B29C*
        *47/627* (2013.01); *C08J 3/201* (2013.01);
        *B01F 2215/0049* (2013.01); *C08J 2325/06*
                                         (2013.01)
(58) Field of Classification Search
    USPC .............................................. 366/76.4, 76.6
    See application file for complete search history.

(56)            References Cited

U.S. PATENT DOCUMENTS 5,749,649 A    5/1998  Schobert-Csongor et al.
    6,391,239 B2   5/2002  Helms et al.
    6,783,710 B1   8/2004  Walder
    2007/0036029 A1  2/2007  Habibi-Naini
    2012/0046372 A1  2/2012  Bogdan et al.

FOREIGN PATENT DOCUMENTS

WO   WO2005056655 A1   6/2005
    WO   WO2006007994 A1   1/2006
    WO   WO2006007995 A2   1/2006
    WO   WO2006058733 A1   6/2006
    WO   WO2008141766 A1   11/2008
    WO   WO2008141767 A2   11/2008
    WO   WO2010069584 A1   6/2010

OTHER PUBLICATIONS

International Search Report dated Jul. 15, 2013 for PCT/IB2013/052653.

* cited by examiner

PROCESS FOR THE INSERTION AND CONVEYING OF LABILE ADDITIVES IN STREAMS OF MOLTEN MATERIAL

The present invention relates to a process for the insertion and conveying of labile additives in streams of molten material.

More specifically, the present invention relates to a process for the insertion and conveying of additives thermally or chemically labile under the process conditions that typically characterize polymeric melts.

Labile additives refer to additives which, under the process conditions, are thermally and/or chemically instable and therefore partially or totally destroyed when mixed with a stream of molten material, for example a molten polymeric stream. Additives that are chemically incompatible in a stream of molten material, for example, a polymeric material, are also considered labile, whether this incompatibility is due to the material itself or due to further additives possibly contained in said stream.

Examples of said labile additives are brominated compounds used for giving flame-retardant properties to the polymer obtained, such as, for example, hexabromocyclododecane (HBCD) or tetrabromobisphenol A bis(allyl ether), and also some additives having a synergistic action on flame retardancy such as 2,3-dimethyl-2,3-diphenyl butane or dicumyl peroxide. These additives are unstable, i.e. they tend to degrade spontaneously at the temperatures used for processing polymeric melts.

This degradation can be accelerated chemically, when certain materials that act as degradation catalysts are used. These catalysts can be considered as being materials incompatible with the additive used, or, viceversa, the additive used can be considered as being chemically labile in the presence of these catalysts. Examples of materials incompatible with brominated organic additives are carbon, its compounds and derivatives, such as carbon black, coke, graphites and graphene nanoplatelets (see for example "Recommended terminology for the description of carbon as a solid"—IUPAC Recommendations 1995).

Carbon, its compounds and, derivative products, can be used for giving particular properties to polymeric melts or end-products deriving therefrom (for example, by increasing the thermal insulation in expanded polystyrene foams as described in WO 2010/069584). At the same time, it may be necessary to add brominated additives to the polymeric mixture to give flame-retardant properties mentioned above. Flame-retardants can be chemically incompatible with carbon, its compounds and derivatives products, as they can considerably accelerate the degradation of the brominated compounds in the polymeric melts.

It has also been experimentally observed that, even without the presence of these materials chemically incompatible with labile additives, the dispersion of these additives in polymeric melts, necessary for them to be effective, can accelerate their degradation.

Consequently a certain degradation of these additives in polymeric melts, in particular brominated organic molecules, is generally unavoidable.

The degradation of brominated additives is undesirable as it can lead to the formation of caustic, toxic or eco-incompatible substances. Furthermore, degradation reduces or cancels the effectiveness of the additive as it reduces the quantity available.

In the case of brominated molecules, a further problem is that degradation can generate hydrogen bromide or hydrobromic acid. This acid is known to be extremely corrosive for steels and other metal alloys normally used for the construction of a plant, consequently the generation of the same can jeopardize the solidity and longevity of the same plant.

In polymeric matrices such as, for example, vinyl aromatic matrices, the acceleration of the degradation of brominated organic additives conferred by these carbon materials can be insomuch rapid and violent as to prevent the joint use of these additives, in particular if both are fed in concentrated form by the same polymer flow. The incorporation of additives in a polymeric phase can be effected by injection of the same through a suitable pumping system when these are previously melted, or are already in the liquid state. For this purpose, an extruder can be used, in which the polymeric phase is already in the molten state or in the form of granules, and wherein the additives are fed in a hopper, melted together with the polymeric stream and mixed therein.

Alternatively, the additives can be melted in a suitable system, and then injected into the polymeric stream by means of a high head pump, for example a piston pump or diaphragm pump.

WO 2008/141766 describes a process for the production of expandable polystyrene (EPS) in continuous mass. The additives are added to the main polymeric stream through a second polymeric stream. The additives can be dispersed in the polymer in this second stream with the help of an extruder equipped with melting and mixing elements to allow a better distribution of the additives in the polymeric phase. Optionally, before entering the extruder, the additives and polymer in granules can be pre-mixed in a suitable mixer for solids, in order to favour a homogeneous distribution of the components and consequently the steadiness of the concentration of the same with time. The preferred device for this operation is a screw mixer.

WO 2008/141767 describes expandable composites based on vinyl aromatic polymers having improved thermal insulation properties and the process for their preparation. Various methods are described for feeding the additives into the polymeric stream, among which some wherein the inorganic carbon compounds are fed separately with respect to the flame-retardant additives. According to a process described, the flame-retardant additives are fed in a polymeric side-stream, and subsequently mixed in the main polymeric stream. Static or dynamic mixers are used for the purpose.

Patents WO 2006/058733, WO 2005/056654, WO 2005/056655 and WO 2006/007994 teach how to produce expandable polymeric materials based on vinyl aromatic polymers, in which the additives, among which some sensitive to the temperature, can be possibly added by means of side extruders. Details on the procedures used for the side addition are not provided, however. Static or dynamic mixing elements are indicated, such as the same extruders, as adequate devices for effecting the mixing of the melt.

EP 0668139 describes a process for the production of expanded polystyrene wherein additives are added, which can deteriorate due to the high operating temperatures during the extrusion phase. This technical problem is particularly significant with flame-retardant additives which can also be incompatible with each other at high temperatures.

In order to overcome this technical problem, a process has been found in which two or more flame-retardants are added, by mixing the polystyrene with a first masterbatch containing additives that are not flame-retardants, in a first phase at 175° C., then mixing this molten mixture with flame-retardant additives in a second phase at a temperature lower than 150° C. EP 0668139 therefore discloses how to mix the polymer with the thermally unstable additive.

U.S. Pat. No. 6,783,710 describes a process for the production of expandable plastic granules, in particular polystyrene. As reported in the text, the disclosure of the invention is based on the discovery that large quantities of expanded granulated material can only be produced in a single apparatus if segregation of the molten polymer and expanding agent, which can also contain other additives such as flame-retardants, is avoided. Segregation is avoided by using static mixers for the whole process duration as repeated in various points of the text.

The document Research Disclosure (October 1986, #27052) "A novel method for processing heat sensitive materials in an extrude polymer foam process" describes a new technique for treating heat-sensitive materials, such as for example hexabromocyclododecane (EBCD). The disclosure affirms that the solid heat-sensitive additives can be added to the foam without feeding them to the main extruder, using, for example, a separate extruder located downstream the main extruder. The temperature at which the thermolabile additives are subjected is therefore reduced by 80° C.

WO 2006007995 describes a process for the production of expandable polystyrene containing flame-retardants in which the residence time of the flame-retardant agent is less than 30 minutes, preferably 10 minutes. According to a preferred procedure, the flame-retardant is pre-mixed in a side extruder together with a fraction of molten styrene polymer and then incorporated in the main molten polymeric stream in order to reduce its thermal decomposition. The polymer introduced into the side extruder is generally about 20% by weight of the total polymer.

All the documents mentioned above describe processes for the production of polymeric resins containing heat-sensitive additives, and possible special procedures for avoiding the thermal degradation of the same.

The criticality that is observed when a labile additive is added to a molten material is the thermal and/or chemical decomposition of these additives during their residence and their transport in said material. This is particularly true for molten polymeric streams. The presence of further additives, such as coke, carbon black, graphite can facilitate the triggering of these decomposition mechanisms, as these compounds can interact with the labile additives, in particular halogenated flame-retardant agents.

The objective of the present invention is therefore to eliminate or in any case reduce the thermal and/or chemical degradation of labile additives when they are incorporated and transported in a molten mass, preferably a molten polymeric mass.

The reduction of the degradation is obtained by segregating the flow containing the labile additives (hereinafter indicated with the term labile flow or stream) from the main flow of molten material (hereinafter indicated with the term main flow or stream), at the same time maintaining both flows in the same transporting pipe.

In order to achieve this, the Applicant has found a process for the insertion and conveying of a labile additive, or a mixture thereof, in a conveying pipe, in which a main stream of molten material flows, said process characterized in that it incorporates said additive, or said mixture, in a portion of the pipe delimited by the main stream, according to one of the following alternative modes:
a) in a longitudinal direction with respect to the flow direction of the main stream of molten material, or
b) in a transversal direction with respect to the flow direction of the main stream of molten material, or
c) according to a composition of the longitudinal (a) and transversal (b) mode,
thus forming a resulting stream which keeps the labile additives segregated from the main stream of molten material.

The process, object of the present invention, can be advantageously used for conveying and staying of said labile additives in molten polymeric streams. This process may be necessary, for example, if the feeding section of these additives is far from the site where these additives are used or mixed in the polymeric stream.

The solution identified by the present invention can also be advantageous when said additives are transported in the molten state alone, and then finally inserted in the polymeric stream.

Further objectives and advantages of the present invention will appear more evident from the following description and enclosed drawings, which are provided for purely illustrative and non-limiting purposes.

FIG. 1 illustrates an example of the implementation mode "M1" and preparation mode "P1" according to the present invention, wherein 15 indicates the labile additives, 16 further non-labile additives, 21 is the main molten polymeric stream, 22 is the molten polymeric stream after incorporation of the additives, 43 is a hopper connected to a gravimetric feeder, 44 is a conveying screw, 45 is the hopper of the extruder, 47 is a filter, 48 is a booster pump, 49 is a startup valve, 50 is an injector, 51 is a transporting pipe without mixing elements.

FIG. 2 illustrates a variant of the implementation mode "M1" and preparation mode "P1" according to the present invention. The indexes 15, 16, 21, 22, 43, 44, 45, 50 and 51 have the same meaning indicated in FIG. 1. According to this variant, part of the main polymeric fluid is fed to the extruder 45 wherein all additives are incorporated.

FIG. 3 illustrates an example of an implementation mode "M1" and preparation mode "P2" according to the present invention, wherein the indexes 15, 16, 21, 22, 43, 44, 47, 48, 49, 50 and 51 have the same meaning indicated in FIG. 1, 56 is a melting equipment having a tank capacity 55 which facilitates the handling of anomalies and start-ups, 57 is a pump.

DETAILED DESCRIPTION

Figure 1:
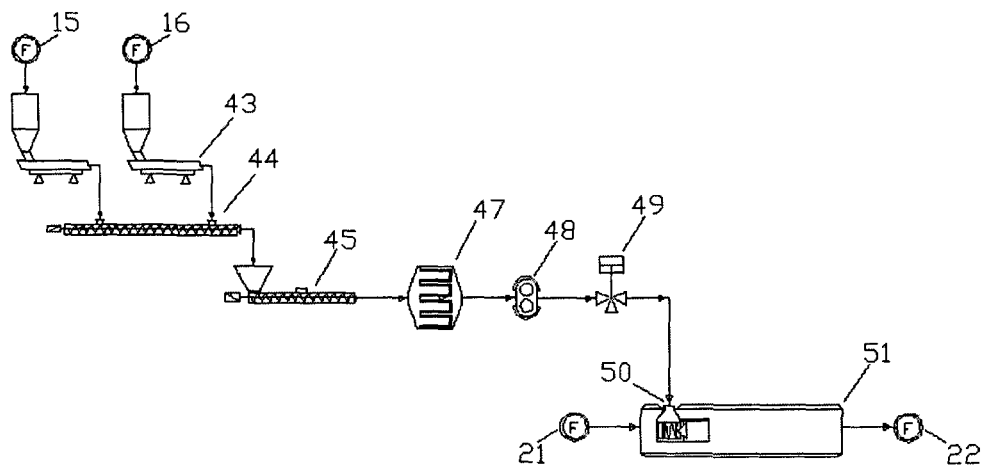

The objective of the present invention is to eliminate or in any case reduce the thermal and/or chemical degradation of labile additives when they are incorporated and transported in a molten mass, preferably a molten polymeric mass. According to the present invention, the reduction in degradation is obtained by segregating the flow containing the labile additives from the main stream of molten material, at the same time, however, keeping both streams in the same transporting pipe.

An object of the present invention therefore relates to a process for the insertion and transporting of a labile additive, or a mixture thereof, in a transporting pipe, in which a main stream of molten material flows. The labile additives, or mixtures thereof, can be advantageously incorporated with a continuous flow, or with a discontinuous flow, preferably intermittent according to a certain frequency (also indicated as "pulsed" in the present text).

The labile additives, or mixtures thereof, are incorporated by means of suitable insertion means in a portion of the pipe delimited by the main stream, according to one of the following alternative modes:

a. in a longitudinal direction with respect to the flow direction of the main stream of molten material, creating a plug flow; or b. in a transversal direction with respect to the flow direction of the main stream of molten material, preferably in a perpendicular direction, or forming an angle less than 90° with respect to the direction of the main flow; or c. according to a composition of the longitudinal (a) and transversal (b) mode.

In this way, a resulting stream is formed, which keeps the labile additives segregated from the main stream of molten material.

The transporting pipe can also contain mixing elements or in any case elements disturbing the fluid-dynamic motion, provided they are positioned so as to keep the main flow of molten material and labile flow substantially segregated, such as, preferably, anchor stirrers or wall-scraper devices.

These devices, if present, must in any case avoid an effective mixing between the main stream and labile stream.

There are no particular limitations in the choice of insertion means of the labile stream into the main stream. For instance, a simple "T" fitting can be used, or a nozzle from which the labile flow is introduced, or an injector.

If an injector is used, an injection sleeve can be used, which is inserted in the pipe of the main stream. This has the aim to insert the labile flow in a well-defined part of the pipe of the main stream, preferably the central part.

The feeding duct of the labile stream can be equipped with a non-return valve, or an equivalent device, which prevents the polymer from returning back through the pipe of the labile stream when the latter is at a pressure lower than the pressure of the main fluid. This condition can occur, for example, if the pumping system of the labile flow is stopped or if the metering is discontinuous.

Said check valve can be advantageously applied close to the injection point, so as to keep the pipe of the labile flow completely uncontaminated by the additives contained in the main stream.

A diverter valve, for example a three-way, can be applied always on the feeding duct of the labile stream, which, if activated, deviates the labile fluid into a recovery tank capacity and at the same time it intercepts the main fluid. In this way, the line containing the labile flow can be reclaimed by feeding a stream not containing labile additives into the same and purging the product thus flushed towards said recovery tank capacity.

The labile flow can be pushed into the conveying pipe without mixing elements by means of any pumping system suitable for the viscosity of the material, for example single-screw or twin-screw extruders, gear pumps, lobe pumps, screw pumps and progressive cavity pumps.

The molten material transported in the main flow can preferably be any polymeric material under the process conditions that characterize polymeric melts, to which finely subdivided solid materials have been possibly added, such as for example athermanous agents, like carbon black, graphite, coke, or nucleating agents such as talc, silica, and/or liquid or gaseous materials as expanding agents such as pentane and butane. In particular, said molten material can have a viscosity ranging from 1 to 10,000 Pa·s and a temperature ranging from 130 to 270° C. under the main flow conditions.

Preferably the material of the labile flow may itself contain the additives described above, preferably flame-retardant additives, preferably brominated organic additives, such as for example hexabromocyclododecane (EBCD), and/or chlorinated organic additives, synergistic compounds, such as, for example dicumyl peroxide (DCP) or 2,3 dimethyl 2,3 diphenyl butane, organic and inorganic bases based on calcium, fluidizing agents, and brominated and/or chlorinated polymers, more preferably brominated and/or chlorinated polymers based on styrene. The labile flow also comprises a stabilizer capable of reducing the release of bromide ions.

The material of the labile flow can have a viscosity ranging from 0.01 to 5,000 Pa·s and a temperature typically within the range of 80 to 230° C. under the conditions immediately preceding insertion in the main fluid. The viscosity ratio between main flow and labile flow, again under the conditions indicated above, must preferably be higher than 0.5. The viscosity ratio between main flow and labile flow must be more preferably higher than 1.5. The viscosity ratio between main flow and labile flow even more preferably ranges from 2 to 20.

Following the disclosures of the method and process conditions described in the present patent application, and better described in the enclosed examples, it is surprisingly possible to substantially reduce the degradation of labile additives. This reduction in degradation implies a greater availability of the additives as degradation generally alters their properties.

Furthermore, degradation by-products can give undesired properties or be toxic, thus jeopardizing the quality of the product obtained.

Even more surprisingly, the object of the present invention can be particularly effective when there is the presence of additional materials (hereinafter defined as "catalysts"), which induce or accelerate degradation of labile additives. In this case, there can be a considerable reduction in the degradation of brominated additives if the catalyst is fed into the main stream, thus keeping it substantially segregated with respect to the stream containing the brominated organic additive.

Preferred examples of catalyst materials are inorganic carbon with respect to brominated organic additives, such as for example hexabromocyclododecane. More specifically, the inorganic carbon can be graphite, coke, carbon black or graphene nanoplatelets. The degradation of the additive can be measured by directly estimating the concentration of the labile additive in the resulting stream, evaluating its reduction with respect to the quantity fed; or by quantifying the known decomposition products.

In the case of brominated molecules, for example, this estimation can be effectively obtained by titration of the hydrobromic acid generated by the relative bromide ions. In fact, at least the portion of bromine atoms that form hydrobromic acid or the bromide ion should not be part of the original brominated organic molecule any more.

Consequently, in these systems, the analytical measurement of the quantity of bromide ions provides a quantitative indication of the degradation of the original brominated organic additive.

A series of embodiments of the present invention, which are not exclusive, are described hereunder, whereby the labile additives are incorporated and transported in a stream of molten material (for example a molten polymeric mass). Configurations resulting from combinations of the procedures described in the present text are also possible.

According to a first embodiment, indicated in the text with "M1", the segregation of the flows is obtained by inserting the fluid containing labile additives in continuous, hereinafter described as flow "B", by means of an injector, into the centre of a transporting pipe without mixing elements, in which a stream of molten mass flows, preferably a polymeric fluid, hereinafter described as flow "A" or "main flow", and allowing said main flow to be distributed between the walls of the pipe and the flow containing labile additives. The injector brings the stream containing labile additives into the centre of the pipe in which the main stream is flowing.

Surprisingly, in this way, a reduction in the residence time of the labile additives with respect to the average residence time is observed experimentally, wherein the residence time is calculated by dividing the volume of the pipe by the volumetric flow-rate of the outgoing fluid.

In a second embodiment, hereinafter called "M2", the flow containing labile additives "B" is inserted in the main flow "A", by means of a transporting line, discontinuously or in pulsed mode. The discontinuous mode is preferably obtained either by regulating the rate of the injection pump of said fluid so that it accelerates or decelerates with a certain time frequency, or preferably it is possible to interpose a valve in the labile flow, which is periodically opened and closed. Rotary valves or piston valves are preferred.

According to a third embodiment, indicated in the present text with "M3", the implementation mode "M2" can be combined with the mode "M1" to obtain an improved separation of the flows. In this way, the labile flow is brought to the centre of the main flow "A" discontinuously or in pulsed mode, by means of an injector positioned at the end of a separate transporting line with respect to the main flow "A".

In a fourth embodiment, hereinafter called "M4", the labile flow is fed as a side stream directly into an extruder. In this case, the main flow can be generated by the same extruder. For instance, if the main flow is of polymeric nature, then the polymer granules and any possible additives from a hopper can be fed to the extruder, either the polymeric flow can be fed to the extruder already in the molten state. A fundamental characteristic, which differs with respect to the side addition technique already known in the art, is that the mixing and/or melting elements, if present, must be positioned before the inlet of the labile flow, so as to limit the mixing of the two flows. Single-screw, twin-screw extruders and derivatives such as Buss and Pomini-Farell (registered trade-marks), or screw pumps, can be used.

In addition to what has already been specified, there are no particular limitations with respect to the position of the inlet point of the labile flow: the labile flow can be introduced in correspondence with the end of the extruder or into the extruder, in an area following the melting area (if present). The ratio (L/D) between the distance (L) that extends between the inlet point of the labile flow and the end of the extruder, and the diameter (D) of the extruder screws is preferably not higher than 15, even more preferably it should not be higher than 5.

According to a fifth embodiment, hereinafter called "M5", the implementation mode "M2" can be combined with the mode "M4", thus englobing the labile flow discontinuously. An injection pump is preferably present along the line of the side stream, which accelerates and decelerates according to a certain frequency, or a valve which is periodically opened or closed.

Techniques already known in the art can be used for the preparation of the labile flow.

In particular, according to a first preparation method, hereinafter called "P1", the labile flow is generated in an extruder or other mixer, in which the additives are melted, possibly mixed and degassed. Examples of equipments suitable for the purpose are twin-screw extruders, such as the equipments produced by Coperion GmbH, single-screw extruders, batch mixers such as "Banbury Mixer", mixing extruders such as "Pomini-Farell" or "Buss" (registered trade-marks). Before being fed into the pipe containing the polymer, the labile flow can be filtered and brought to a higher pressure, for example by means of a gear pump. In the start-up and shut-down phases, or for other plant anomalies, the process conditions can be such that degradation of the labile flow can no longer be avoided. Advantageously in order to prevent contamination of the main flow with decomposition products, a shut-off and purging valve can be inserted, before introduction into the main flow, in order to allow the degraded product to be diverted elsewhere.

In addition to said labile additives, the labile flow can contain other additives, such as fluidifying agents, nucleating agents, plasticizers, pigments, and others. The labile flow can also contain a part of the material of the same type as that used in the main stream.

In a second preparation method, hereinafter called "P2", the labile additives, and other additives such as, in particular, fluidifying agents and melting agents, can be fed to a melting unit. The additives are heated in the melting unit, for example by means of electrical resistances or coils through which a thermovector fluid passes, and melted. The additives can be stirred in the melting unit in order to accelerate the heat exchange and consequently the melting process, therefore causing a reduction in the residence times and consequently in general a reduction in the degradation obtained. The molten product obtained is then pressurized by means of a suitable pump (for example a gear pump for viscosities higher than 100 Pa·s or a spiral or progressive cavity pump for lower viscosity values) and then fed into the main stream "A" according to one of the embodiments described and claimed in the present text.

As already specified in various points of the present text, the main stream "A" can preferably be a polymeric material, preferably a thermoplastic polymer. Among thermoplastic polymers to which the present invention can be applied, vinyl and vinyl aromatic polymers and its alloys can be mentioned, such as a butadiene-styrene copolymer (HIPS), styrene-acrylonitrile copolymers and acrylonitrile-butadiene-styrene copolymers (ABS), also expandable. The expandability can be obtained by incorporating a fluid into the polymeric matrix, which is capable of forming a gaseous phase following extrusion, for example carbon dioxide, for the production of expanded polystyrene sheets (XPS). Alternatively, the expanding agent can be kept incorporated in the granulated polymer, thus obtaining expandable polystyrene (EPS). Mixtures of n- and iso-pentane are normally used as expanding agents for this purpose.

The transporting pipe in which there is the contact between the labile flow "B" and the main flow "A" can be any device suitable for transporting fluids in the molten state. The transporting pipe is preferably the barrel of an extruder, preferably a section of jacketed or coiled of diathermic oil pipe, or a line accessory such as a pressurized recipient. Line accessories and pressurized recipients, if they also exert the function of transporting the main melt "A" and labile additives "B" can be equally adequate for the purpose.

The section of transporting pipe can be circular, elliptic, square or hexagonal, lobed. The section is preferably circular.

The form of the transporting pipe can be preferably straight or curved, for example spiral.

The labile flows enter the transporting pipe through an injector whose form does not have particular limitations. Anyway, it can be advantageous that at least part of the injector of the labile fluid "B" is shaped so as to determine the alignment, at least a partial alignment, of the fluid "B" with respect to the direction of the main flow "A".

This expedient can be particularly advantageous when the main flow "A" has a viscosity at least five times higher than the viscosity of the labile flow "B" under the injection process conditions (shear deformation rate and temperature).

Figure 6:
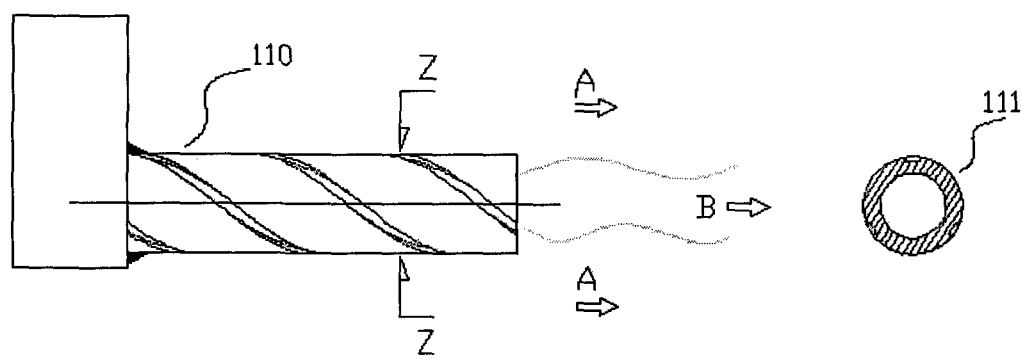
FIG. 6 illustrates an injector for the implementation mode "M1" according to the present invention, wherein A is the main polymeric stream that flows around the injector and B is the flow containing the labile additives leaving the injector, 110 is the injector in a side view, whereas 111 shows the section Z-Z of the same.
Figure 7:
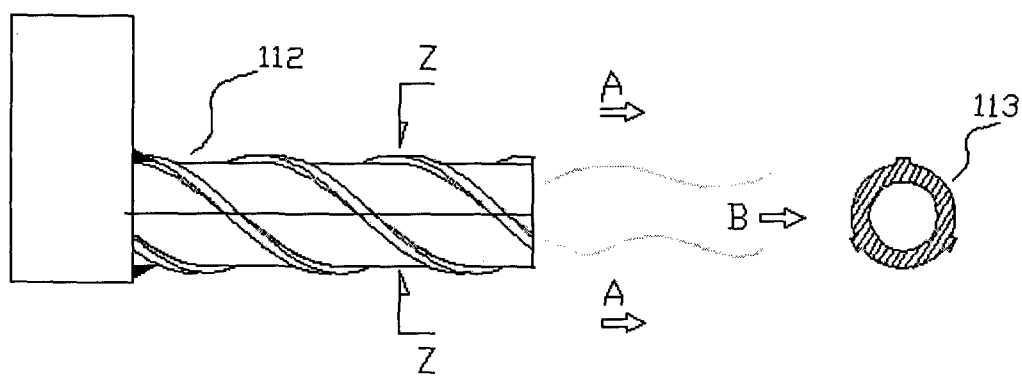
FIG. 7 illustrates an injector for the implementation mode "M1" according to the present invention, wherein the indexes A and B have the same meaning indicated in FIG. 6, 112 is the injector in a side view, whereas 113 shows the section Z-Z of the same.
Figure 8:
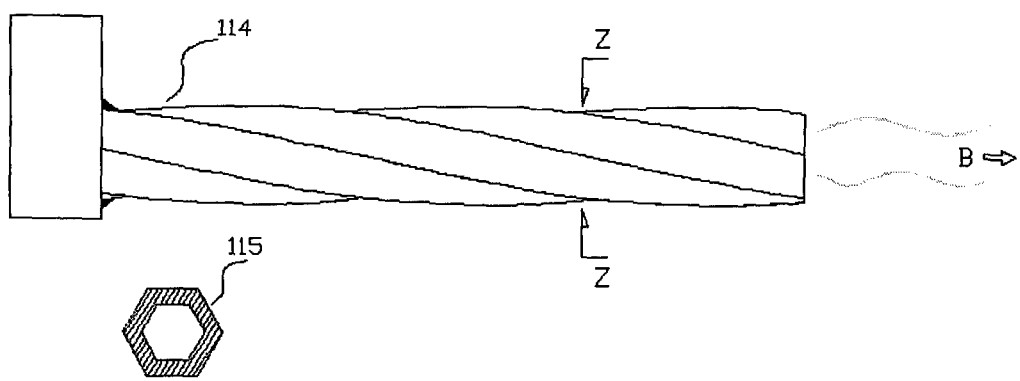
FIG. 8 illustrates an injector for the implementation mode "M1", wherein B is the flow containing labile additives, 114 is the injector in a side view, whereas 115 shows the section Z-Z of the same.

The alignment can be obtained by suitably shaping a zone of the injector, in particular the terminal part, so that it is parallel or in any case aligned with the direction of the main flow "A" as also illustrated, for example, in FIGS. 6, 7 and 8. For the sake of brevity, hereunder said area aligned with the direction of the main flow is referred to with the term "sleeve". The sleeve preferably has a length equal to at least a tenth of the hydraulic diameter of the transporting pipe, more preferably a length equal to at least a third of the hydraulic diameter of the pipe.

There are no particular restrictions with respect to the form of the injector. The sleeve is preferably circular, annular or polygonal; in this latter case, more preferably quadrangular or hexagonal. If the sleeve does not have a cylindrical section and is twisted, there is surprisingly a better segregation between the flows "A" and "B". Even more preferably, the injector can have grooves or ribs, which further improve the segregation efficiency.

The Applicant will now describe some possible particular embodiments of the present invention with reference to the figures illustrated in the present text and in the case in which the main flow "A" is a polymeric material.

FIG. 1 illustrates a possible embodiment of the implementation mode "M1" with the preparation mode of the additives "P1". The labile additives (15) and other possible additives (16) are charged into the hoppers of gravimetric feeders (43), which control the flow-rate of the additives, estimating their weight loss with time. The conveying screw (44) pre-mixes the additives and takes them into the hopper of the extruder (45) where they are melted and possibly mixed and degassed. A filter (47) removes gels and other contaminations. The booster pump (48) pressurizes the additives in order to exceed the pressure of the polymer fed to the pipe (21). The start-up valve (49) can divert the additives towards the ground or another storage site, for the start-up or other anomalies, or send the additives towards the polymeric flow. The injector (50), optionally equipped with a check valve, injects the labile additives into the centre of the transporting pipe of the polymer (51), so that the polymer is interposed between the walls of the pipe and the labile fluid. The insertion of elements such as online filters, flow regulators, shut-off or diverter valves, pumps for increasing the pressure (booster pumps), such as gear pumps, is also possible between the injector (50) and the transporting pipe (51).

Figure 2:
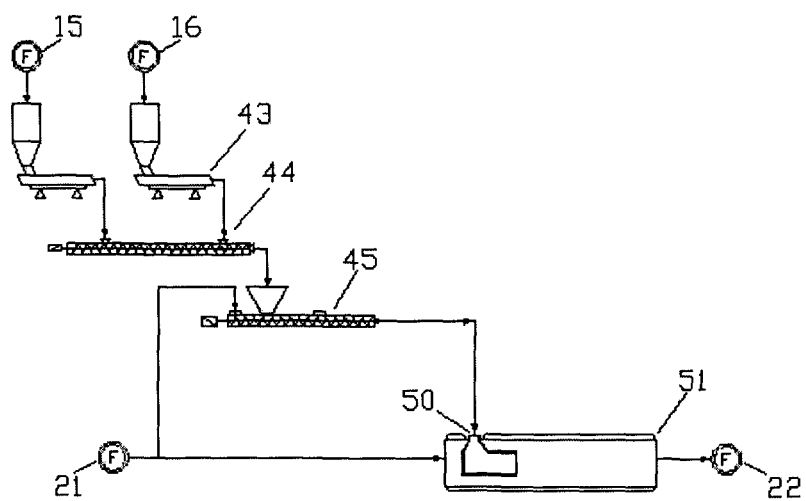

FIG. 2 illustrates a variant of the implementation mode "M1" with the preparation mode of the additives "P1". According to this variant, part of the polymeric fluid "A" is fed to the extruder (45) where it incorporates the labile additives (15) and other possible additives (16).

Figure 3:
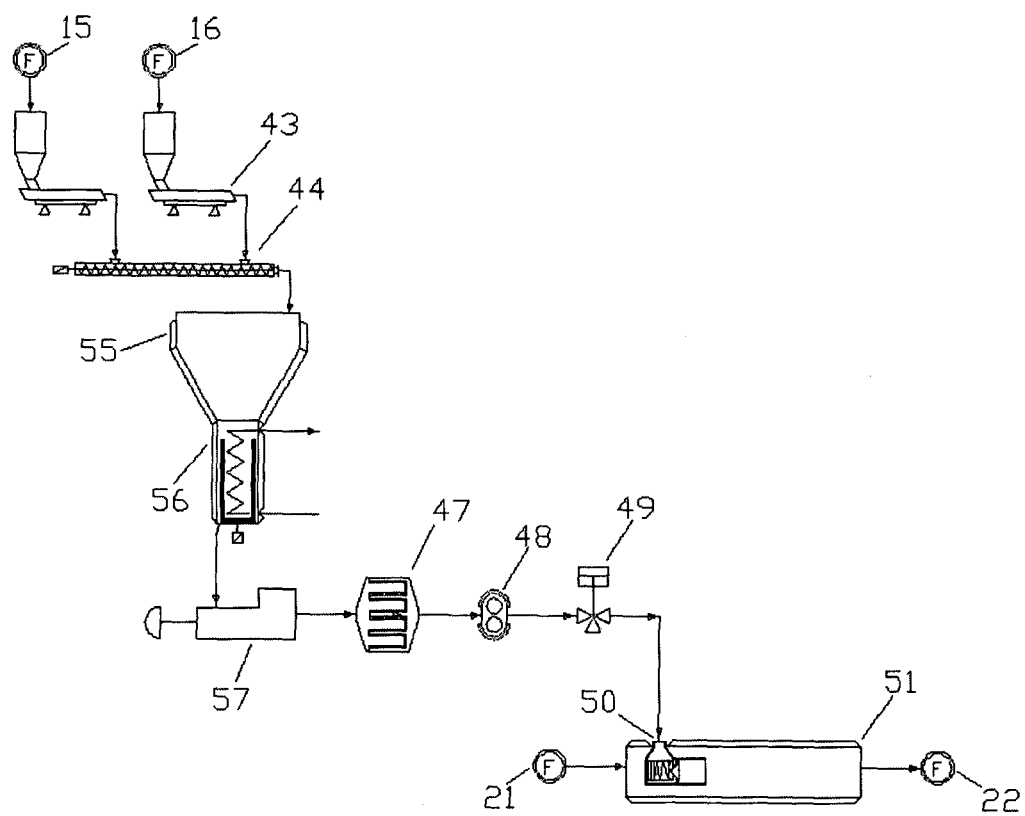

FIG. 3 illustrates an example of the implementation mode "M1" with the preparation mode of the additives "P2". The labile additives (15) and other possible additives (16) are fed to a conveying screw (44) to a melter (56), the latter possibly having a capacity tank (55) which facilitates the management of anomalies and start-ups. The melter (56) can be produced with a coil through which a fluid having a higher temperature flows, located inside the fluid to be melted, so that it passes through, or externally, for example by means of a jacket applied to the melter itself. The melting unit (56) can advantageously comprise static mixing elements or dynamic mixers, such as, for example, anchor or belt mixers. The molten product is then removed from the pump (57) and injected into the transporting pipe (51). In order to improve the plant management, it can be useful to interpose a filter changer (47), a pressurization pump (48), a start-up valve (49) and all other devices and instruments normally used for managing polymeric melts.

Figure 4:
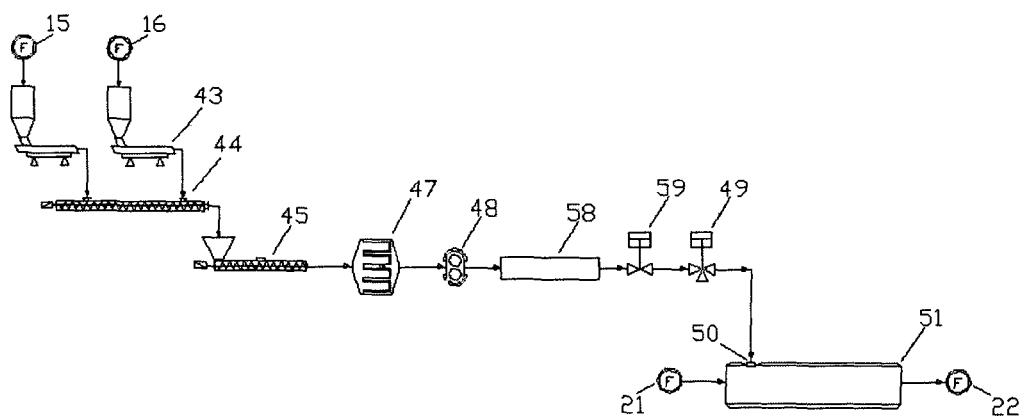
FIG. 4 illustrates an example of implementation mode "M2" and preparation mode "P2" according to the present invention, wherein the indexes 15, 16, 21, 22, 43, 44, 45, 47, 48, 49 and 51 have the same meaning indicated in FIG. 1, 50 is a feeding point, 58 is a tank capacity, 59 is an shutoff valve.

FIG. 4 illustrates an example of the implementation mode "M2" with the preparation mode of the additives "P1". The labile additives (15) and other possible additives (16) are fed to a conveying screw (44) to an extruder (45) which melts them. The melt thus obtained is filtered (47), pressurized by a gear pump (48) and then sent to a capacity unit (58) before reaching the shut-off valve (59). The capacity unit is a tube, recipient or other piece of line having a volume which is such as to reduce variations in pressure which are produced when the interception valve is opened or closed. The volume of said capacity unit should generally be equal to at least a tenth of the volume sent by the pump (48) within an hour, preferably equal to at least a fourth, even more preferably equal to at least half. The valve (59) is periodically opened and closed, in order to inject the flow "B" into the polymeric flow "A" discontinuously.' The start-up valve (49) allows the product "A" to be deviated towards an alternative discharge for the start-up, shut-down or other process anomalies. The flow "A" then enters (50) the pipe (51) where the polymeric stream "B" flows.

Figure 5:
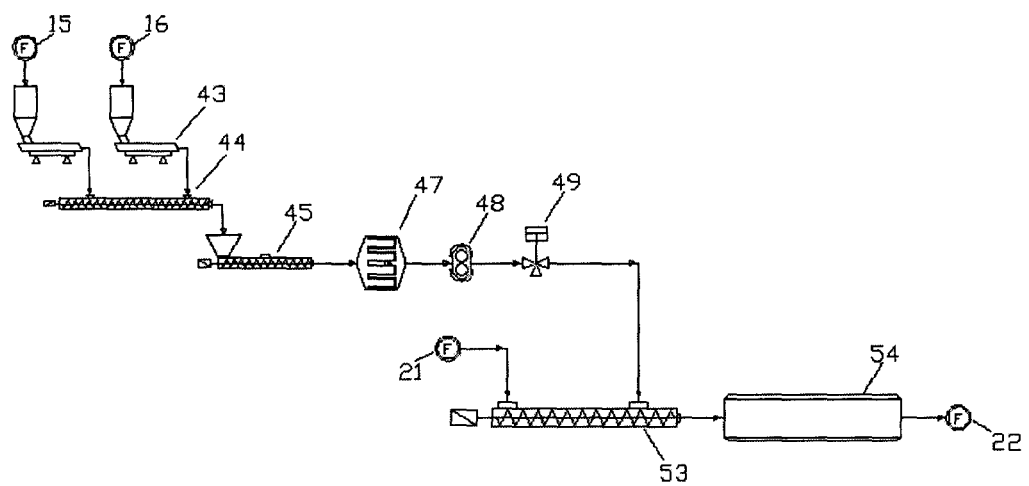
FIG. 5 illustrates an example of implementation mode "M4" and preparation mode "P1" according to the present invention, wherein the indexes 15, 16, 21, 22, 43, 44, 45, 47, 48 and 49 have the same meaning indicated in FIG. 1, 53 is a screw extruder, possibly containing mixing elements, before the injection point of the thermolabile additives, 54 is a conveying pipe without mixing elements.

FIG. 5 illustrates an example of the implementation mode "M3" and the preparation mode "P1". The labile additives (15) and other possible additives (16) are fed to a conveying screw (44) and then extruded (45). The melt thus obtained is filtered (47) and pressurized by a pump (48). The start-up valve (49) diverts the fluid in the case of process anomalies or for the start-up and shut-down. The polymer "A" is fed to the extruder (53), where it is possibly melted and mixed by suitable elements of the melting and mixing screw. The flow "B" coming from the valve (49) is fed from a side inlet of the extruder (53). The screw elements of the extruder after the side inlet point are conveying and compression elements. The combination of fluids thus obtained is then fed to a conveying pipe (54).

FIGS. 6 to 8 illustrate some examples of injectors representative of the invention. FIG. 6 shows a cylindrical injector having a three-starts spiral groove, and the relative sectional figure Z-Z.

FIG. 7 shows an injector having a rib again in a three-principle spiral form, and the relative sectional figure Z-Z.

FIG. 8 shows an injector with a twisted hexagonal section, and the relative sectional figure Z-Z.

The process, object of the present invention, can be advantageously used for the production of granulated polymers with retarded flame propagation and granulated expandable polymers with retarded flame propagation. A preferred application of the present invention relates to processes for the production of granulated polymers contemporaneously containing one or more flame-retardant agents, such as organic brominated compounds, brominated polymers and carbon-based materials such as graphite, carbon black, petroleum coke, soot, carbon nanotubes, graphene nanoplatelets.

EXAMPLES

Example 1 Comparative 437 parts of polystyrene (GPPS) N1782, having a molecular weight of 185 kDa and a melt flow index at 200° C., 5 kg of 8 g/10'; 456 parts of a masterbatch consisting of 50% of N1782 and 50% of Needle Coke 4727 sold by Asbury Graphite Mills Inc. (USA) with a MT50% particle-size of about 6 micron, a BET of about 11 m$^2$/g; 10 parts of Perkadox 30® (2,3-dimethyl-2,3-diphenylbutane, sold by Akzo Nobel); 87 parts of Saytex HP900G (hexabromocyclododecane), sold by the company Albemarle, 10 parts of inorganic stabilizer (a mixture of calcium oxide, aluminium oxide and hydroxide), are fed to a twin-screw extruder.

The product leaving the extruder (residence time, calculated as volume covered by the fluid divided by the volumetric flow-rate: about 30 seconds) enters a static mixer where it remains for 3 minutes, before being drawn and rapidly cooled in a stream of continuously cooled water.

The temperature on the barrels of the extruder, as well as the temperature of the diathermic oil which is circulating in the jacket of the static mixer, is set at 190° C. The temperature measured into the melt leaving the die before cooling in water is 190° C.

The product thus obtained was analyzed by determining the total bromine content, and content of free bromides. The latter are determined by dissolving a predetermined quantity of sample in a suitable solvent, adding an aqueous solution, mixing vigorously and then calculating the quantity of bromine ions (i.e. the "free bromides") dissolved in the aqueous phase.

The total bromine, expressed as HBCD content, is equal to 8.5% and the free bromides produced are equal to 3560 ppm.

Figure 9:
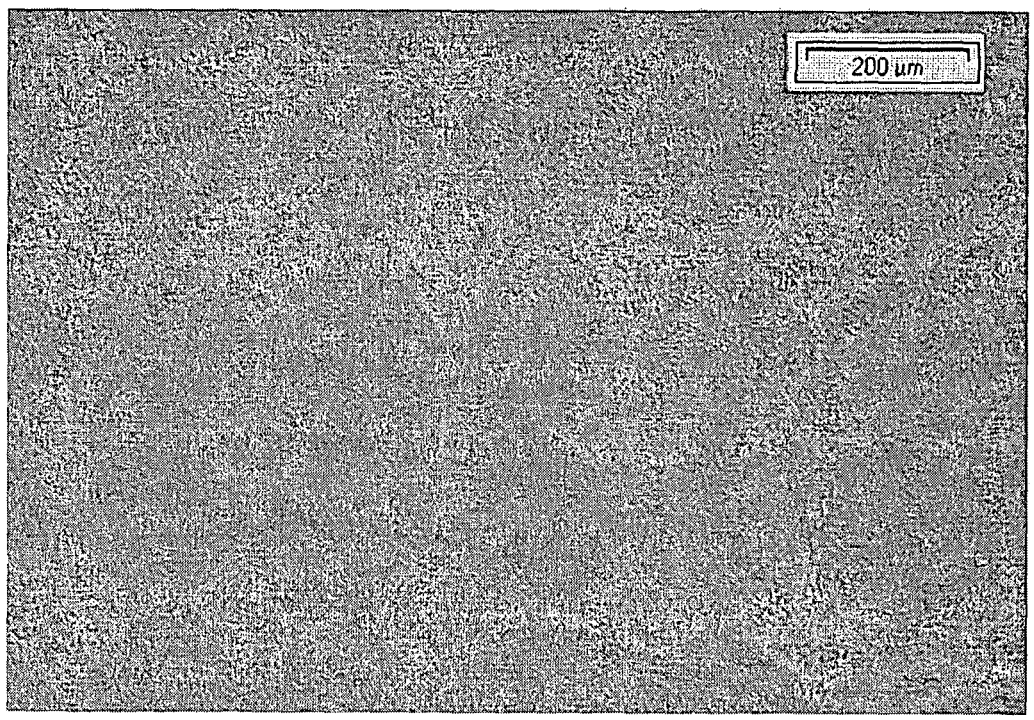
FIGS. 9, 10, 11, 12, 13 and 14 show the electronic microscope analysis of the samples obtained according to the examples provided in the present text.

A sample was subjected to scanning electron microscopy analysis (SEM). FIG. 9 reproduces the image obtained.

Example 2 Comparative

Comparative example 1 is repeated, maintaining the same formulation but reducing the flow-rate of additives and therefore bringing the residence time in the static mixer to 5 minutes.

The product thus obtained was analyzed, determining the total bromine content, and content of free bromides.

The total bromine, expressed as HBCD content, is equal to 8.53% and the free bromides produced are equal to 8700 ppm.

Example 3

417 parts of polystyrene (GPPS) N1782, having a molecular weight of 185 kDa and a melt flow index at 200° C., 5 kg of 8 g/10'; 456 parts of a masterbatch consisting of 50% of N1782 and 50% of Needle Coke 4727 sold by Asbury Graphite Mills Inc. (USA) with a MT50% particle-size of about 6 micron, a BET of about 11 m$^2$/g; 10 parts of Perkadox 30° (2,3-dimethyl-2,3-diphenylbutane, sold by Akzo Nobel), are fed to a twin-screw extruder.

87 parts of Saytex HP900G (hexabromocyclododecane), sold by the company Albemarle, 10 parts of inorganic stabilizer (a mixture of calcium oxide, aluminium oxide and hydroxide), and 20 parts of polystyrene of the type N1782 in powder granule form, are fed to a single-screw extruder.

The flow coming from the single-screw extruder is inserted in the flow coming from the twin-screw extruder coaxially, using an injector of the type illustrated in FIG. 6, the part aligned with the direction of the flow having a length equal to half of the diameter of the pipe.

The product thus obtained is passed into a temperature controlled pipe, i.e. equipped with a jacket in which diathermic oil regulated at the desired temperature, flows.

The residence time in the temperature controlled pipe, calculated as a ratio between the volume occupied by the fluids and the sum of the flow-rates of the two extruders, is 3 minutes.

The product leaving the temperature controlled pipe is passed through a die and is then rapidly cooled by a stream of continuously cooled water.

The temperature established on the barrels of the twin-screw extruder, as also the temperature of the diathermic oil which is circulating in the jacket of the transporting pipe, is equal to 190° C. The temperature established on the barrels of the single-screw extruder, on the other hand, is 160° C. The temperature measured on the melt leaving the die before cooling in water is equal to 190° C.

The product thus obtained was analyzed by determining the total bromine content, and content of free bromides.

The total bromine, expressed as HBCD content, is equal to 7.9% and the free bromides produced are equal to 229 ppm.

The viscosity ratio between the flow coming from the single-screw extruder and the flow coming from the twin-screw extruder, under the temperature conditions immediately before the injector, is resulted about 2.5.

Figure 11:
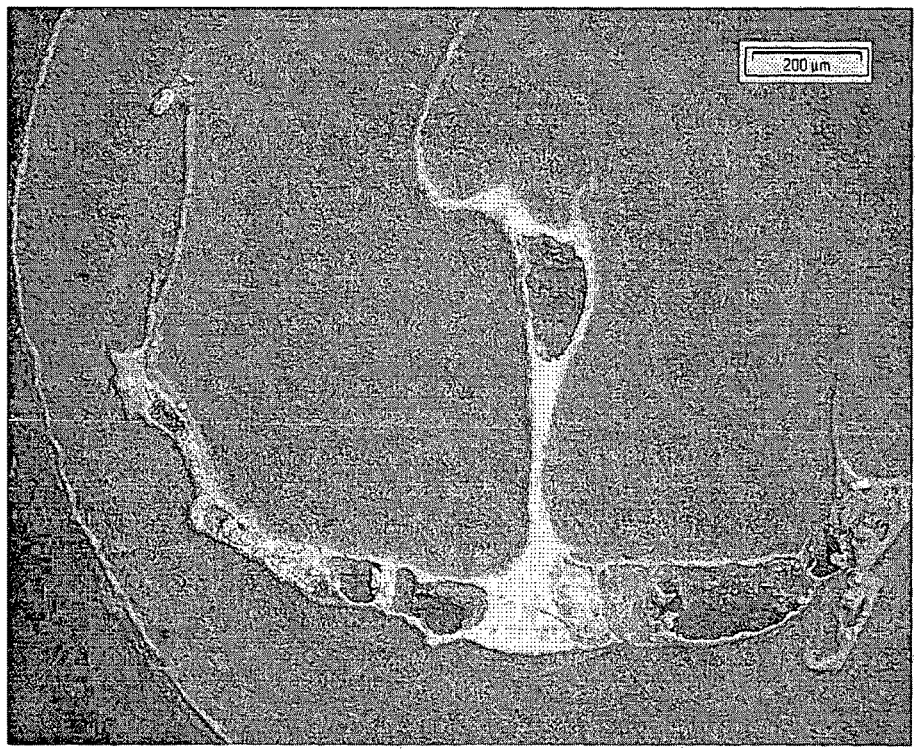
Figure 14:
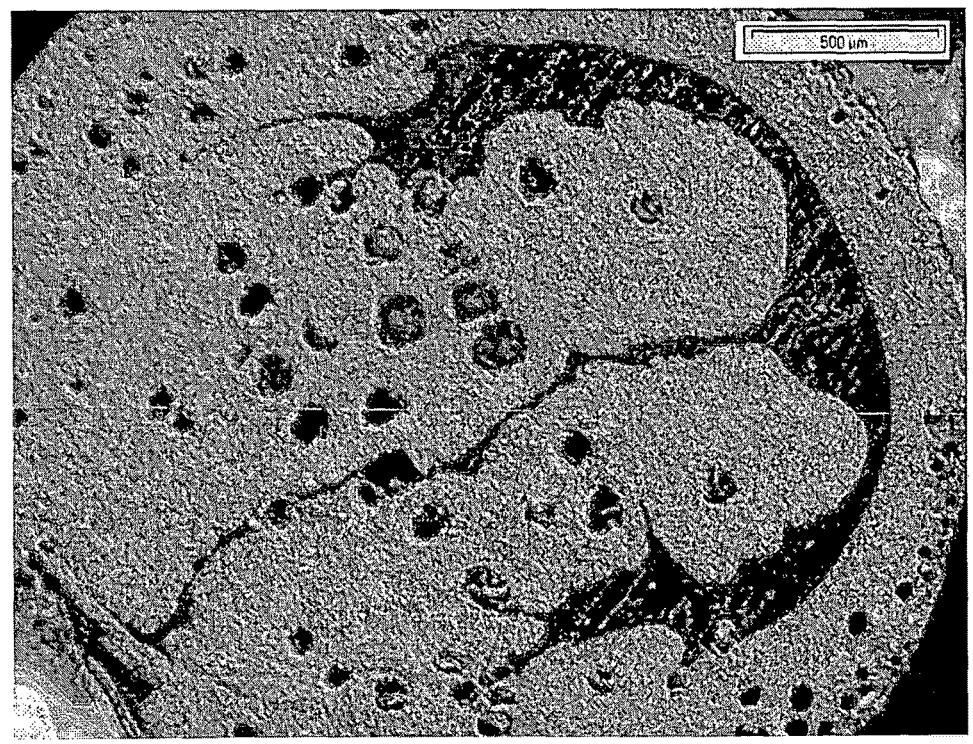

A sample of product was subjected to scanning electron microscopy analysis (SEM), the result is shown in FIG. 11. Another sample was analyzed with an optical microscope. The result is shown in FIG. 14.

Example 4

Example 3 is repeated, but slowing down the flows of both extruders so as to have a residence time on the transporting pipe equal to 5 minutes. The total bromine, expressed as HBCD content, was measured and is equal to 7.7% and the free bromides produced are equal to 197 ppm.

Example 5

Example 3 is repeated, but using expandable polystyrene (EPS) of the type Giotto 5000 sold by Polimeri Europa, containing 5% of pentane, in replacement of polystyrene N1782.

The total bromine, expressed as EBCD content, was 8.3% and the free bromides produced were 129 ppm.

Example 6

Example 3 is repeated, but 87 parts of Saytex HP900G (hexabromocyclododecane) sold by the company Albemarle and 10 parts inorganic stabilizer (a mixture of calcium oxide, aluminium oxide and hydroxide), are fed to the single-screw extruder. The temperature of the single-screw extruder was set at 155° C.

The analysis of total bromine, expressed as HBCD content, proved to be equal to 8.0% and the free bromides produced were equal to 305 ppm.

Figure 10:

A sample of product was analyzed by scanning electron microscopy (SEM), the result is shown in FIG. 10.

Example 7

Example 3 is repeated, but 87 parts of Saytex HP900G (hexabromocyclododecane), sold by the company Albemarle, 10 parts of inorganic stabilizer (a mixture of calcium oxide, aluminium oxide and hydroxide) and 77 parts of polystyrene of the type N1782 in milled granule form, are fed to the single-screw extruder. The temperature of the single-screw extruder was set at 170° C.

The analysis of total bromine, expressed as HBCD content, proved to be equal to 9.4% and the free bromides produced were equal to 23 ppm.

Figure 12:
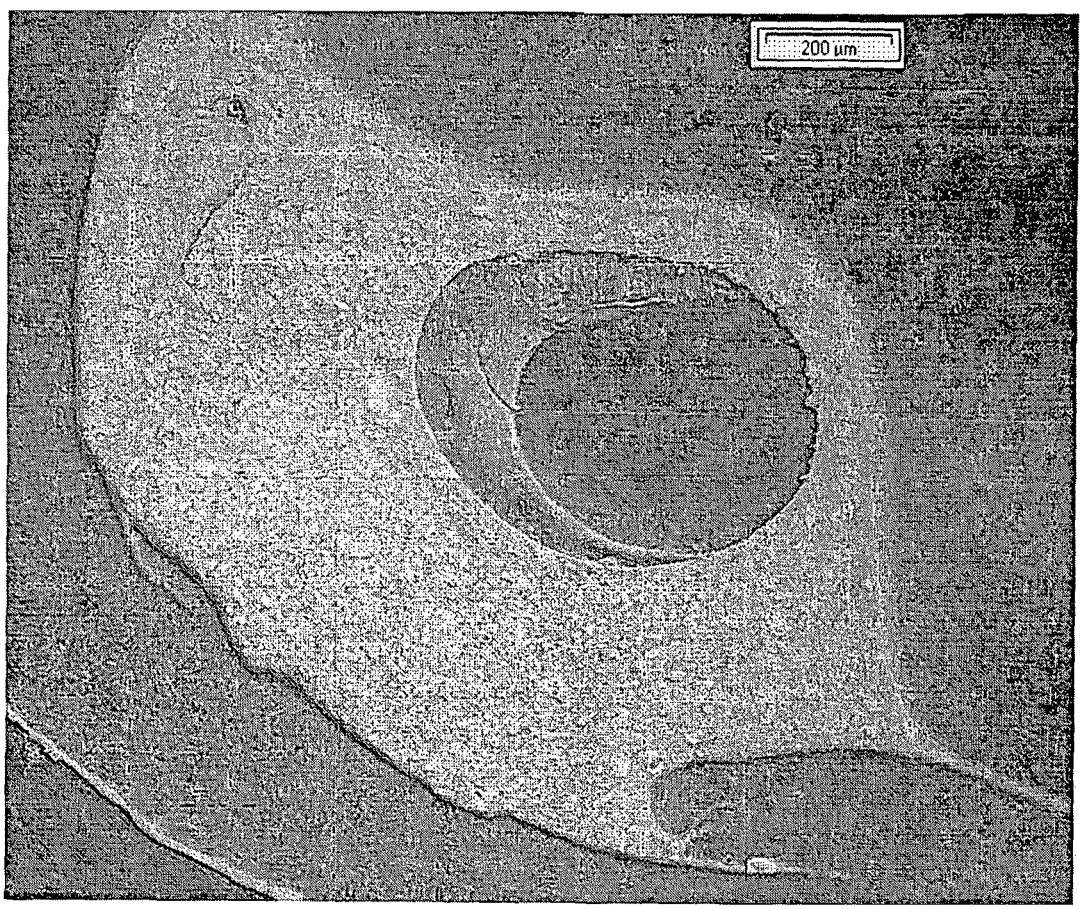

A sample of product was analyzed by scanning electron microscopy (SEM), the result is shown in FIG. 12.

Example 8

Example 7 is repeated, but slowing down the flows of both extruders so as to have a residence time on the transporting pipe equal to 5 minutes.

The analysis of total bromine proved to be equal to 7% (9.3% as EBCD) and the free bromides produced are equal to 30 ppm.

Example 9

Example 8 is repeated, but increasing the length of the pipe so as to have a residence time on the transporting pipe equal to 10 minutes.

The analysis of total bromine proved to be equal to 8.5% as HBCD, and the free bromides produced were equal to 50 ppm.

Example 10

Example 3 is repeated, but Perkadox 30 is not fed to the twin-screw extruder. 110 parts of Emerald 3000 (brominated polymer supplied by Great Lakes Solutions, business unit of Chemtura), 10 parts of inorganic stabilizer (a mixture of calcium oxide, aluminium oxide and hydroxide), 10 parts of Perkadox 30 and 90 parts of polystyrene of the type N1782 in milled granule form, are fed to the single-screw extruder. The temperature of the single-screw extruder was set at 190° C.

The analysis of total bromine proved to be equal to 6.8% and the free bromides produced were equal to 24 ppm.

Figure 13:
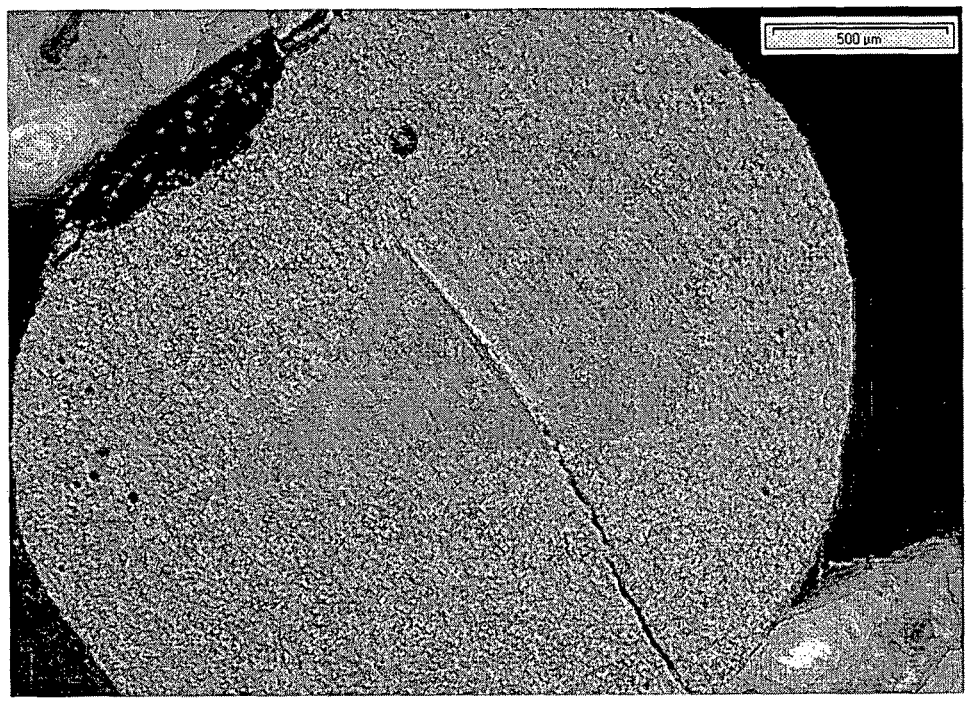

A sample of product was analyzed by scanning electron microscopy (SEM), the result is shown in FIG. 13.

Example 11

Example 10 is repeated, but slowing down the flows of both extruders so as to have a residence time on the transporting pipe equal to 5 minutes. The total bromine was measured and proved to be equal to 7.3% and the free bromides produced are equal to 28 ppm.

Example 12

Example 3 is repeated, but Perkadox 30 is not fed to the twin-screw extruder, whereas 87 parts of Saytex HP900P (hexabromocyclododecane), 10 parts of inorganic stabilizer (a mixture of calcium oxide, aluminium oxide and hydroxide) and 20 parts of dicumyl peroxide are fed to the single-screw extruder. The temperature of the single-screw extruder was set at 135° C.

The residence time on the pipe was set at 5 minutes, slowing down the flows from both extruders.

Analysis of the dicumyl on the sample thus obtained proved to be equal to 1.7%.

Example 13

The formulation, temperatures and flow-rates of Example 3 are repeated but the melt coming from the single-screw extruder is fed to the side inlet of the twin-screw extruder, according to mode M4.

In the twin-screw extruder, the side inlet is located at a distance of 32 diameters from the hopper. In the subsequent 8 diameters, there are conveying and compression elements.

The twin-screw extruder feeds the same temperature controlled transporting pipe already described in Example 3, followed by granulation of the product.

The residence time proved to be 3 minutes. The total bromine was measured and proved to be equal to 7.1% and the free bromides produced are equal to 380 ppm.

Example 14

417 parts of polystyrene (GPPS) N1782, having a molecular weight of 185 kDa and a melt flow index at 200° C., 5 kg of 8 g/10'; 456 parts of a masterbatch consisting of 50% of N1782 and 50% of Needle Coke 4727 sold by the company Asbury Graphite Mills Inc. (USA) with a MT50% particle-size of about 6 micron, a BET of about 11 m$^2$/g; 10 parts of Perkadox 30® (2,3-dimethyl-2,3-diphenylbutane, sold by Akzo Nobel), are fed to a twin-screw extruder.

87 parts of Saytex HP900G (hexabromocyclododecane), sold by the company Albemarle, 10 parts of inorganic stabilizer (a mixture of calcium oxide, aluminium oxide and hydroxide), and 20 parts of polystyrene of the type N1782 in milled granule form, are fed to a single-screw extruder.

The flow coming from the single-screw extruder is pressurized by means of a gear pump, and then conveyed to a pipe that acts as capacity unit, where the labile fluid has an average residence time of 2 and a half minutes. Said pipe terminates with a rotary valve whose rotating body consists of a solid disk in which there is a pass-through hole along one diameter. The inlet and outlet are at 180°. When the hole is aligned between the inlet and the outlet, an opening is created and the labile fluid can pass to the other part; viceversa, in the other positions, the solid disk clogs the passage and prevents the fluid from flowing.

The rotational valve is rotated at 2 rpm. In this way, a pulsed flow is obtained, with a frequency equal to 4 pulses per minute each with a duration of about one and a half seconds. After passing through the rotary valve, the labile fluid is inserted in the main polymeric flow by means of an injector.

The product thus obtained is passed into a temperature controlled pipe, i.e. equipped with a jacket in which diathermal oil regulated at the desired temperature, flows.

The pressure of the pipe acting as capacity unit is maintained at about 30 bar higher than the pressure of the receiving temperature controlled pipe in order to prevent backflows.

The residence time in the temperature controlled pipe, calculated as a ratio between the volume occupied by the fluids and the sum of the flow-rates of the two extruders, is 3 minutes.

The product leaving the temperature controlled pipe is passed through a die and is then rapidly cooled by a stream of continuously cooled water.

The temperature set on the barrels of the twin-screw extruder, as also the temperature of the diathermal oil which is circulating in the jacket of the transporting pipe, is equal to 190° C. The temperature set on the barrels of the single-screw extruder, on the other hand, is 160° C. The temperature measured on the melt leaving the die before cooling in water is equal to 190° C.

The product thus obtained was analyzed by determining the total bromine content, and content of free bromides.

The total bromine, expressed as HBCD content, is equal to 7.0% and the free bromides produced are equal to 289 ppm.

Discussion of the Examples

The production of free bromides shows degradation of the brominated flame-retardant agent, as the original brominated flame-retardant agent is substantially free of these.

In the comparative examples, the quantity of free bromide produced is about 3500 ppm after 3 minutes and 8700 ppm after 5 minutes, showing a rapid degradation of HBCD and therefore a poor stabilization of the same.

In examples 3 to 11, the production of free bromide was significantly lower, even if substantially the same formulation was used (in particular, the same ratios between HBCD and coke).

The important reduction in the production of free bromides indicates that a strong reduction in the degradation of the product was obtained.

Example 12 shows that the same technique can be applied to other thermolabile compounds, such as dicumyl peroxide, obtaining comparable results.

Example 13 shows that comparable results can be obtained by inserting the labile stream laterally with respect to the extruder of the main stream.

Example 14 shows comparable results obtained with a pulsed flow of the labile additive.

Analyses effected with an electronic and optical microscope of the samples obtained from the examples set forth above showed a clear separation between the phase containing the brominated agent and the polymeric phase containing coke.

This separation is totally absent in the case of the comparative examples.

In both the examples and comparative examples, a quantity of stabilizer in excess with respect to the production of free bromides, was used, so as to not only not damage the equipment but also ensuring correct results from the analyses. The excess of stabilizer, in fact, allows the free bromide to be fixed, which could otherwise be lost as a gaseous emission, thus altering the results of the analyses.

The invention claimed is:

1. A process for the insertion and conveying of a labile additive in a transporting pipe with a main molten polymeric material, comprising
providing a main stream containing molten polymeric material;
providing a secondary stream containing a labile additive, or a mixture thereof;
providing a transporting pipe;
feeding said main stream into said transporting pipe;
wherein said secondary stream has a viscosity ranging from 0.01 to 5000 Pa·s, a temperature ranging from 80 to 230° C., and a viscosity ratio between said main stream and said secondary stream is greater than 0.5, all of which is taken immediately prior to feeding into said main stream;
segregating said secondary stream and said main stream in said transporting pipe, by feeding said secondary stream according to one of the following alternative modes:
a) in a longitudinal direction with respect to the flow direction of said main stream, or
b) in a transverse direction with respect to the flow direction of said main stream, or
c) according to a combination of the longitudinal direction and the transverse direction;
transporting said secondary stream and said main stream along said transporting pipe for a residence time of at least 3 minutes, while maintaining said secondary stream and said main stream segregated;
whereby said segregation of said secondary stream and said main stream in said transporting pipe results in said labile additive, or mixture thereof, exhibiting reduced thermal and/or chemical degradation.

2. The process according to claim 1, wherein said secondary stream containing the labile additive, or mixture thereof, is fed into the transporting pipe with continuous flow or discontinuous flow.

3. The process according to claim 1, wherein said secondary stream containing the labile additive, or mixture thereof, is incorporated perpendicularly with respect to the flow direction of the main stream of molten material.

4. The process according to claim 1, wherein said secondary stream containing the labile additive or mixture thereof, is incorporated in the central part of the transporting pipe.

5. The process according to claim 1, wherein said secondary stream containing the labile additive, or mixture thereof, is incorporated by means of a side extruder or an injector.

6. The process according to claim 5, wherein at least part of the injector is shaped so as to align said secondary stream containing the labile additive, or mixture thereof, in the direction of the main stream of molten material.

7. The process according to claim 6, wherein said shaped part is the terminal part of the injector.

8. The process according to claim 7, wherein the terminal part is aligned with the direction of the main stream.

9. The process according to claim 8, wherein the length of the terminal part of the injector is at least a tenth of the hydraulic diameter of the transporting pipe.

10. The process according to claim 6, wherein the part of the injector aligned with the direction of the main stream of molten material does not have a cylindrical section and is twisted.

11. The process according to claim 6, wherein the part of the injector aligned with the direction of the main stream of molten material has grooves or ribs.

12. The process according to claim 1, wherein said secondary stream containing the labile additive, or mixture thereof, is melted before being incorporated in the transporting pipe.

13. The process according to claim 1, wherein the main stream of molten material is a molten thermoplastic polymer.

14. The process according to claim 1, wherein mixing elements are not present in the transporting pipe.

15. The process according to claim 1, wherein the labile additives, or mixtures thereof, are brominated and/or chlorinated organic materials.

16. The process according to claim 15, wherein said brominated and/or chlorinated organic materials are polymeric.

17. The process according to claim 15, wherein said secondary stream containing the labile additive, or mixture thereof, also comprises a stabilizer capable of reducing the release of bromine ions.

18. The process according to claim 1, wherein the main stream of molten material contains one or more material chemically incompatible with said labile additive.

19. The process according to claim 18, wherein said chemically incompatible material is an inorganic compound of carbon as element.

20. The process according to claim 19, wherein said inorganic compound of carbon as element is coke, carbon black, graphite or graphene nanoplatelets.

21. The method of claim 1, comprising feeding said secondary stream into said main stream with a pulsed flow.

22. The method of claim 1, comprising transporting said secondary stream and said main stream along said transporting pipe at a slower rate for a residence time of at least 5 minutes.

23. The method of claim 1 wherein said labile additive, or Mixture thereof, includes an expanding agent.

24. The method of claim 1 wherein said reduced thermal and/or chemical degradation is not more than 305 ppm of bromide ions from said labile additive, or mixture thereof.

25. The method of claim 24 comprising transporting said secondary stream and said main stream along said transporting pipe at a slower rate for a residence time of at least 5 minutes resulting in a lower amount of said bromide ions from said labile additive, or mixture thereof.

* * * * *